Jan. 5, 1960     C. R. NICKOLS     2,919,805
WATER SOFTENER
Original Filed Sept. 28, 1951     11 Sheets-Sheet 1
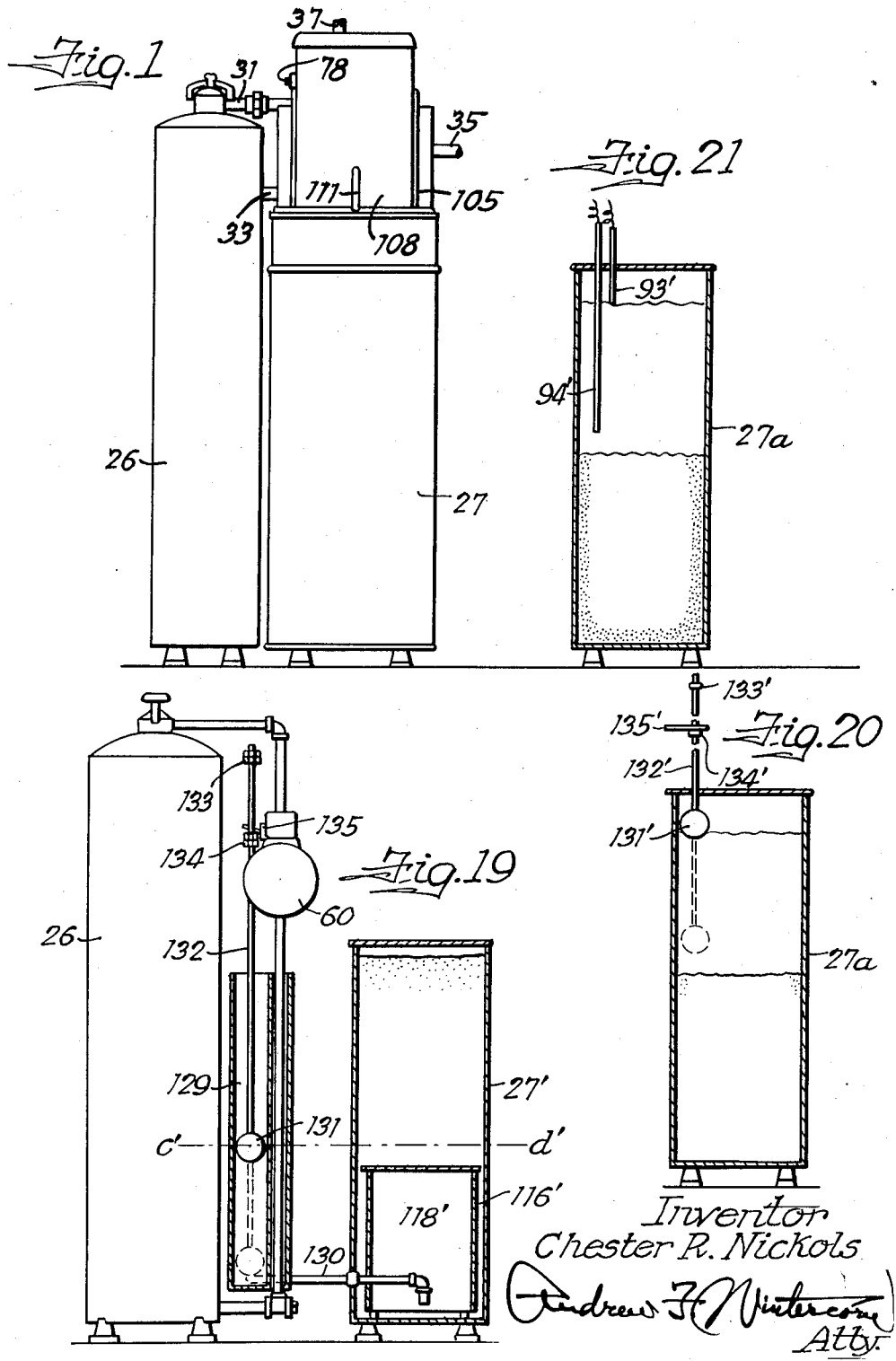
Inventor
Chester R. Nickols

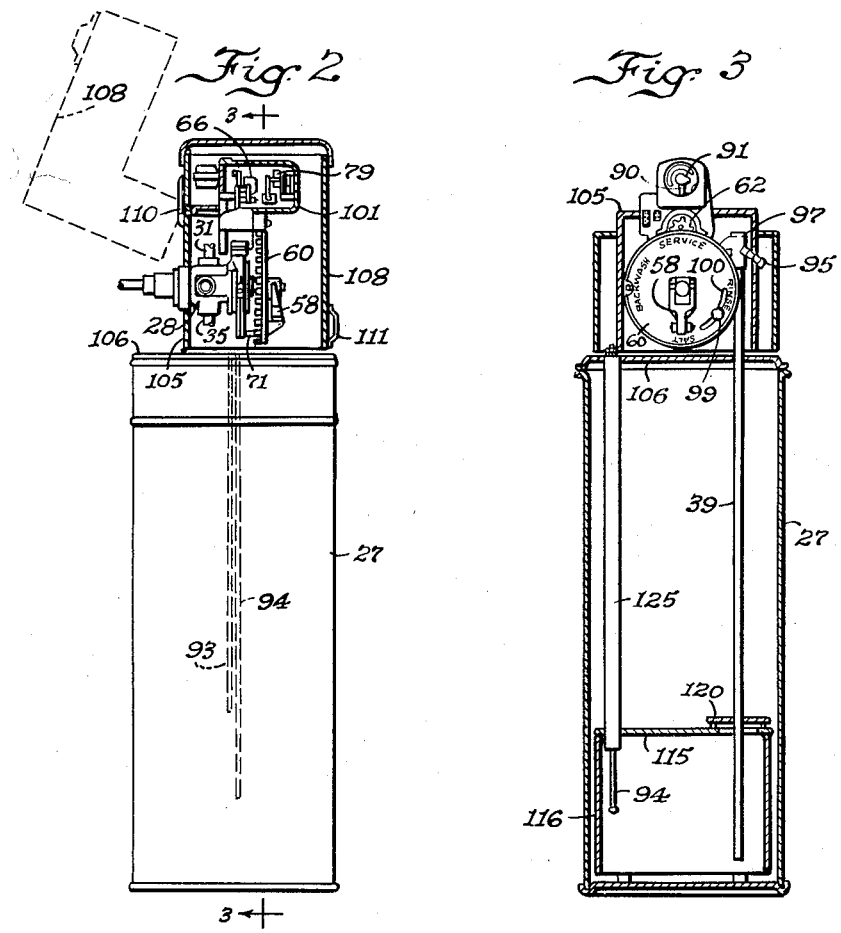

Jan. 5, 1960 C. R. NICKOLS 2,919,805
WATER SOFTENER
Original Filed Sept. 28, 1951 11 Sheets-Sheet 3
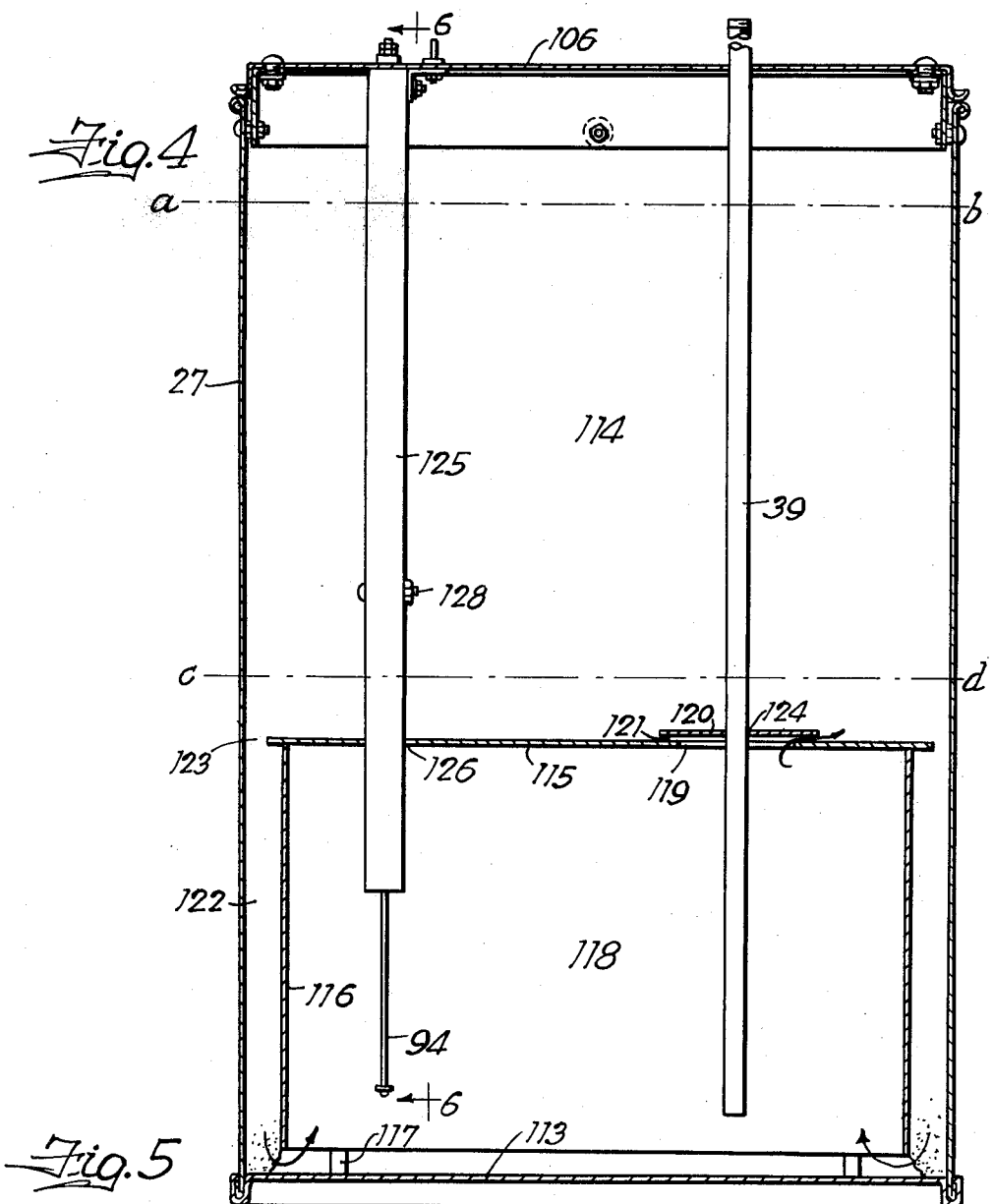
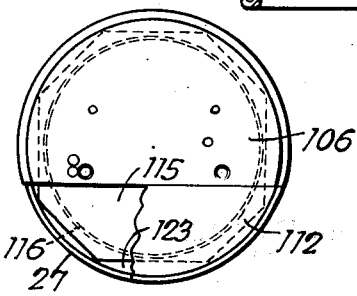
Inventor
Chester R. Nickols
Atty.

Jan. 5, 1960 C. R. NICKOLS 2,919,805
WATER SOFTENER
Original Filed Sept. 28, 1951 11 Sheets-Sheet 4
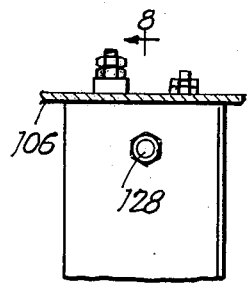
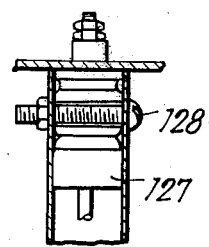
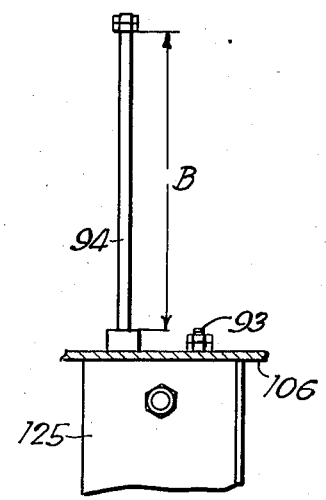
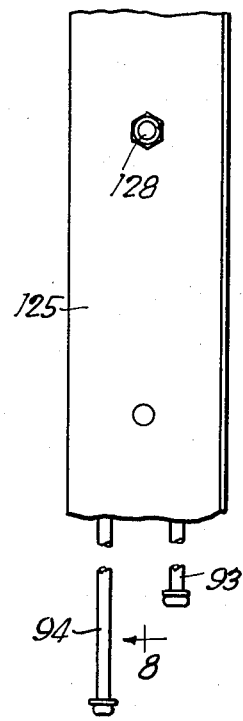
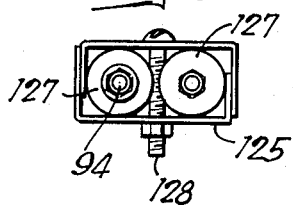
Inventor
Chester R. Nickols
Atty.

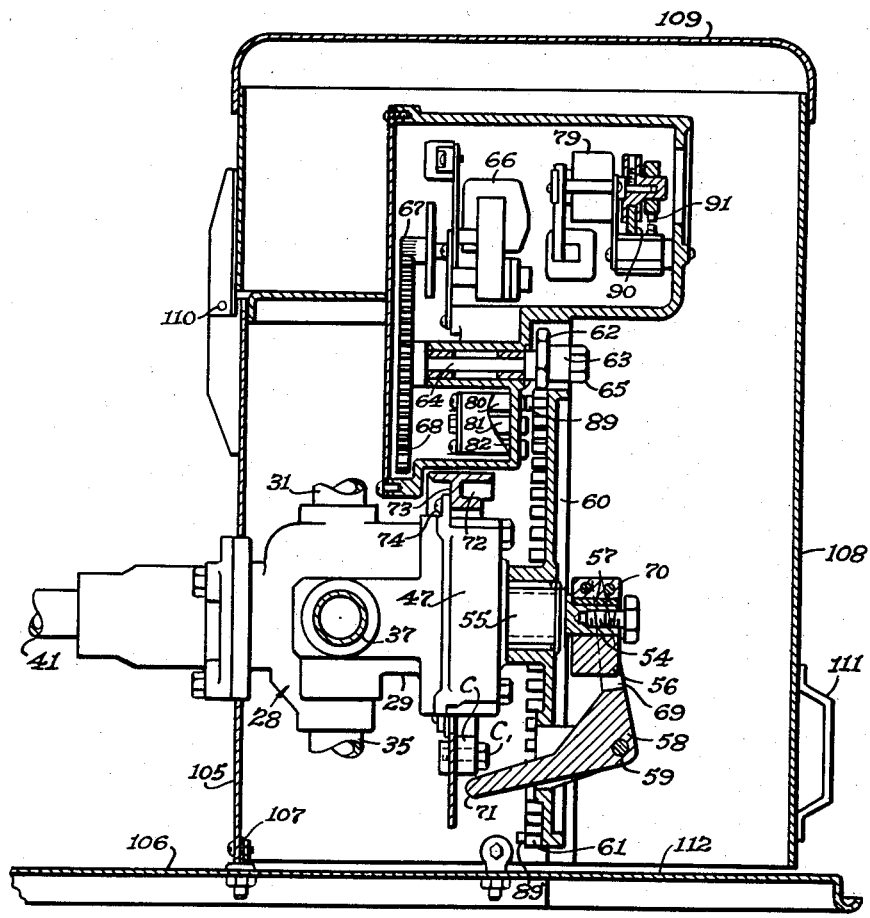

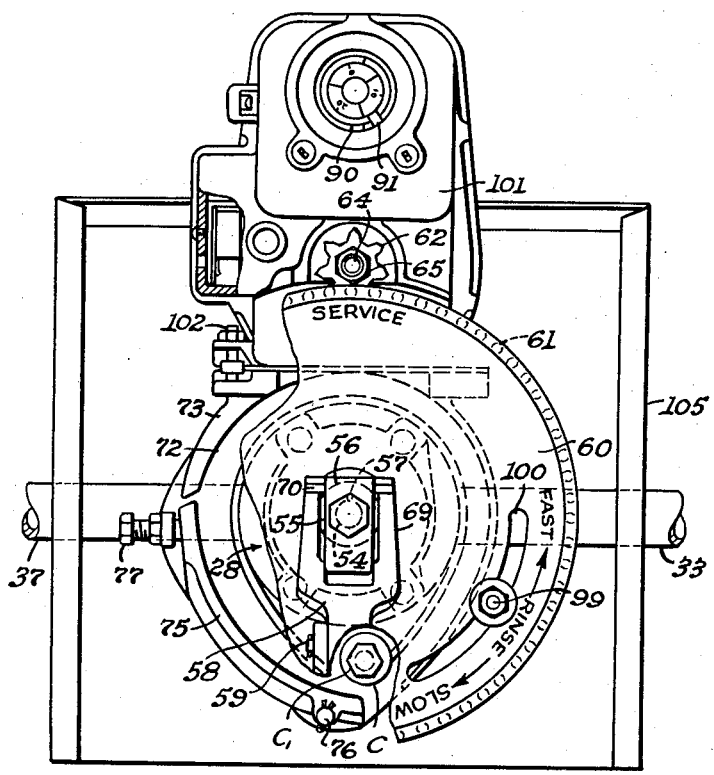

Jan. 5, 1960     C. R. NICKOLS     2,919,805
WATER SOFTENER
Original Filed Sept. 28, 1951     11 Sheets-Sheet 7
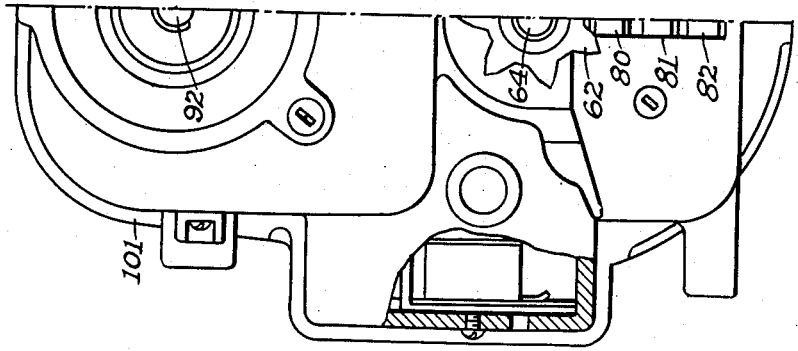
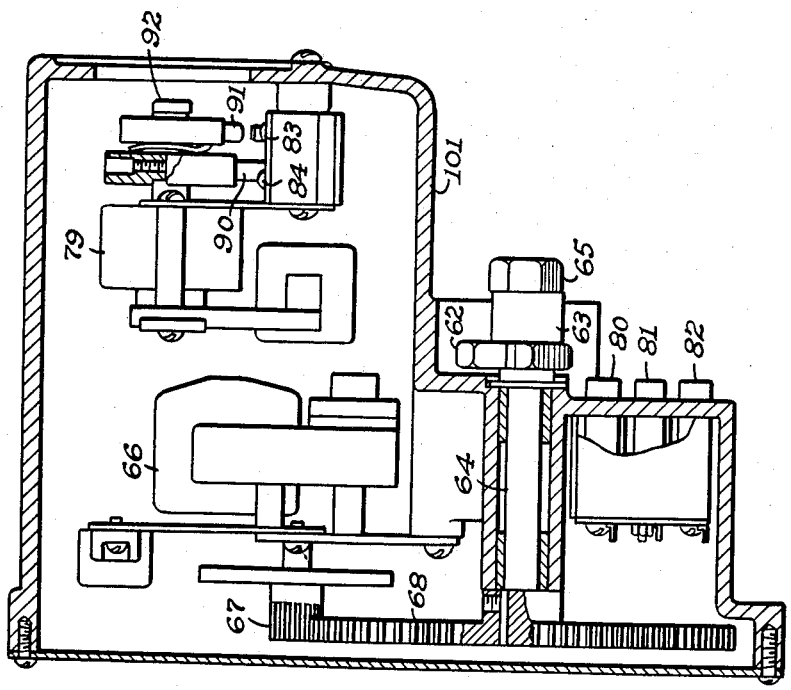
Inventor
Chester R. Nickols Jan. 5, 1960 C. R. NICKOLS 2,919,805
WATER SOFTENER
Original Filed Sept. 28, 1951 11 Sheets-Sheet 8
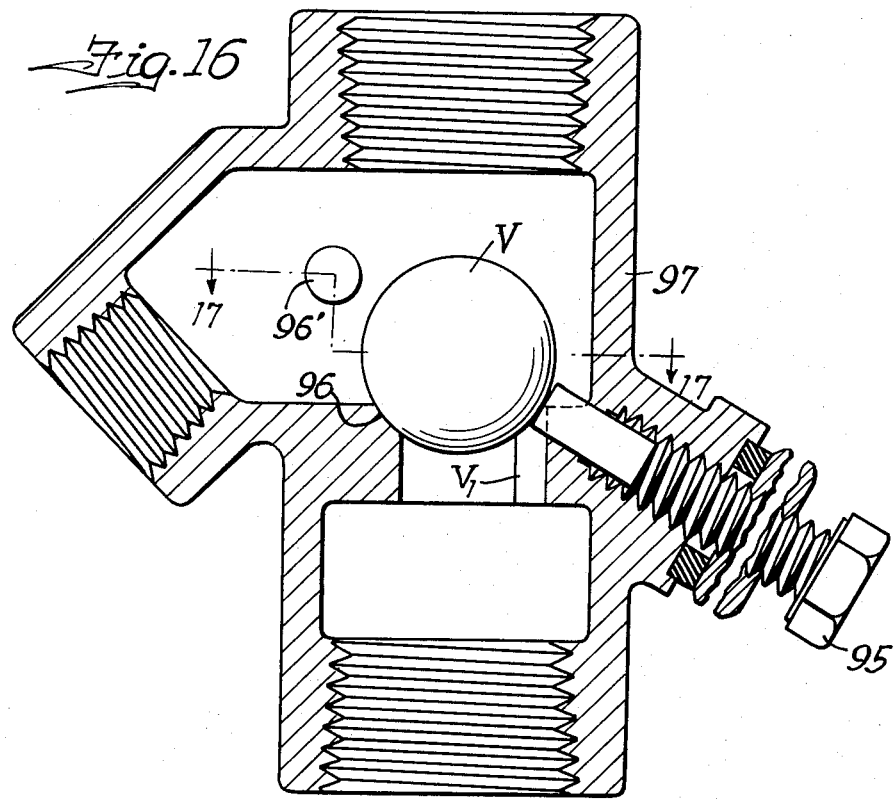
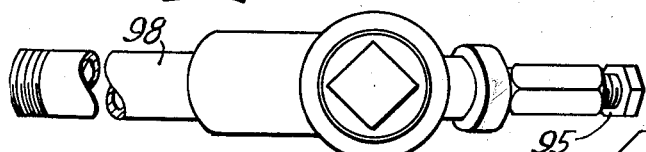
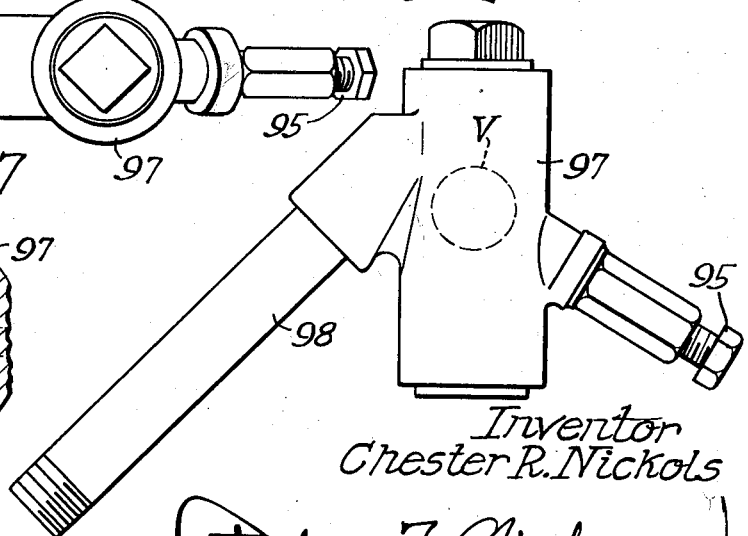
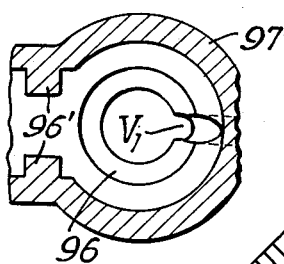
Inventor
Chester R. Nickols
Atty.

Jan. 5, 1960     C. R. NICKOLS     2,919,805
WATER SOFTENER

Original Filed Sept. 28, 1951     11 Sheets-Sheet 9

Inventor
Chester R. Nickols
Atty

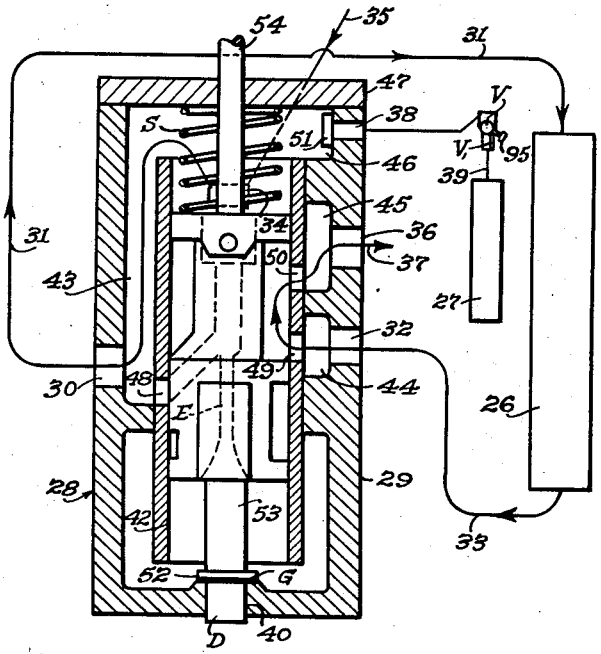
Fig. 22 (SERVICE)
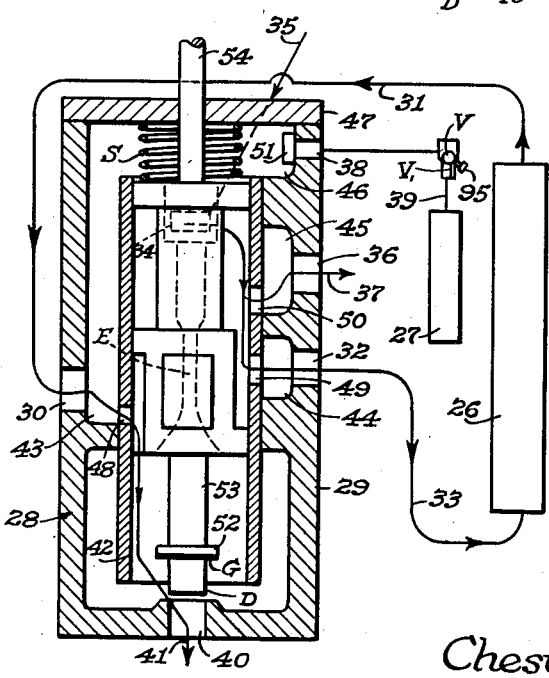
Fig. 23 (BACKWASH)
Inventor
Chester R. Nickols

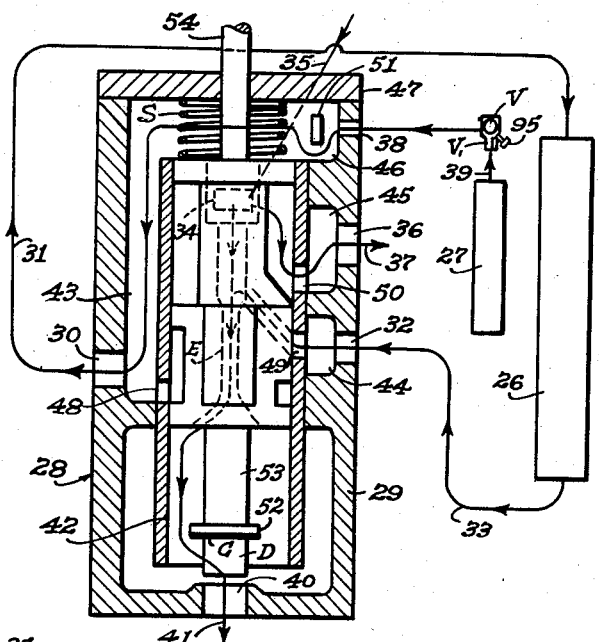
Fig. 24 (SALT DRAW)
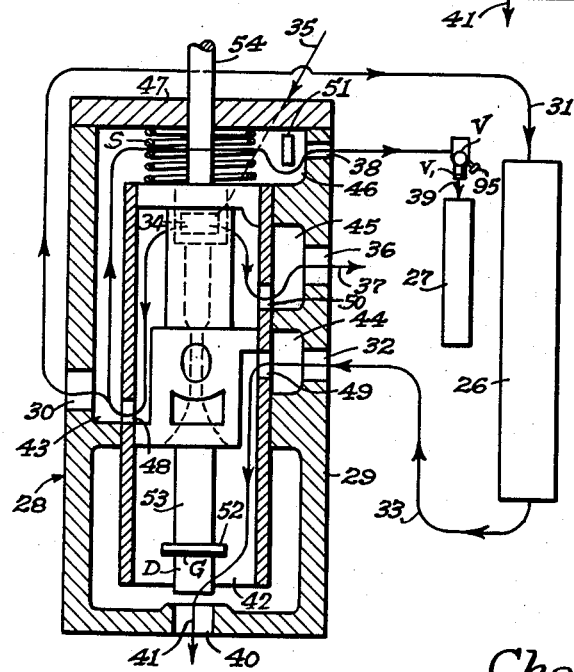
Fig. 25 (RINSE & REFILL)
Inventor
Chester R. Nickols United States Patent Office 2,919,805
Patented Jan. 5, 1960

2,919,805

WATER SOFTENER

Chester R. Nickols, Sycamore, Ill., assignor to Elgin Softener Corporation, Elgin, Ill., a corporation of Illinois Original application September 28, 1951, Serial No. 248,714, now Patent No. 2,799,294, dated July 16, 1957. Divided and this application March 12, 1954, Serial No. 415,834

11 Claims. (Cl. 210—141)

This application is a division of my copending application, Serial No. 248,714, filed September 28, 1951, which resulted in Patent No. 2,799,294, issued July 16, 1957.

This invention relates to base exchange water softeners and more particularly automatic and semi-automatic softeners, the softener herein disclosed being one designed to be set into operation by the pressing of a push-button switch and to go through its complete cycle of regeneration thereafter automatically.

In the softener of my invention, the "Rinse" is timed by the time it takes to refill the brine tank with raw water after the "Salt Draw" or "Brining," the flow of water to the brine tank for refilling being restricted to a small fraction of that going to the softener for rinse purposes, whereby to insure a sufficient total volume of waer for adequate rinsing of the bed in the softener regardless of variation in pressure, inasmuch as the variations in pressure will affect both rinse flow and refill flow alike. In order to operate in this way, I employ electrodes in the brine tank extending downwardly to different levels and these are electrically connected with an automatic control unit to accurately measure the amount of brine delivered from the brine tank to the water softener, using the breaking of the electric circuit incident to the dropping in the level of the brine in the brine compartment from the one terminal to a point below the other terminal to cause the shifting of a flow control valve from the Salt Draw or Brining position to the Rinse position, and conversely, using the making of an electric circuit incident to the rise in the level of the water in the brine compartment at the end of the refill operation to cause the shifting of the flow control valve from the rinse position back to "Service" position.

An important object of the invention is to provide, in addition to providing as a timing adjustment for the rinse an accurately adjustable bleeder or leak valve for adjusting the refill flow, means for adjusting the rinse flow rate, this latter means being a lug on the operating wheel of the flow control valve that is adjustable along an arcuate slot so as to operate a limit switch in a predetermined position of angularity of the operating wheel and accordingly predetermine the rotary adjustment of the plunger of the flow control valve and thereby predetermine the port opening and rinse flow obtained.

Another object is to provide an automatic control mechanism which permits the selection of the Backwash time, said mechanism including a timer motor, the low speed driven shaft of which requires, says, 30 minutes, for example, to make a complete turn, and has two cams turning with it, each arranged to operate a limit switch, and the cams being adjustable angularly relative to one another according to the backwash time desired—anywhere up to as much as 30 minutes.

Still another object of my invention, in so far as the brine tank or saturator is concerned, is to provide a unit designed to eliminate the well known objections to conventional brine tanks, by reversing the saturation operation and having the salt compartment above and the brine compartment below, the brine tank having a brine concentrator drum in the bottom portion leaving ample storage space for salt above it, so that the supplying of salt has no relation to the amount of water or brine in the lower portion of the tank and whenever there is any room for additional salt it may be put in. Furthermore, whatever scum and sludge may separate out from the salt accumulates in the sump provide in the bottom of the brine compartment below the brine outlet, instead of being carried into the water conditioner or softener. This brine tank, while usable with any water conditioner or softener, is of particular advantage when used in connection with automatics or semi-automatics, because of the fact that there is no uncertainty in regard to the all important question as to the presence of an adequate amount of salt; any time there is room for additional salt, the operator can see that at a glance and supply it.

The invention is illustrated in the accompanying drawings, in which—

Fig. 1 is a front elevation of a complete water softener installation embodying the improvements of my invention;

Fig. 2 is a side view of the brine tank and the automatic control mechanism above it, showing the cover in section and indicating in dotted lines the open position of the cover;

Fig. 3 is a vertical section on the line 3—3 of Fig. 2, with the cover opened and showing the automatic control mechanism in front elevation;

Fig. 4 is a vertical section through the brine tank or saturator;

Fig. 5 is a plan view of Fig. 4 on a smaller scale with a portion of the removable cover broken away to show the brine drum;

Fig. 6 is a detail on the line 6—6 of Fig. 4;

Fig. 7 is a plan view of Fig. 6;

Fig. 8 is a section on the line 8—8 of Fig. 6;

Figure 18:
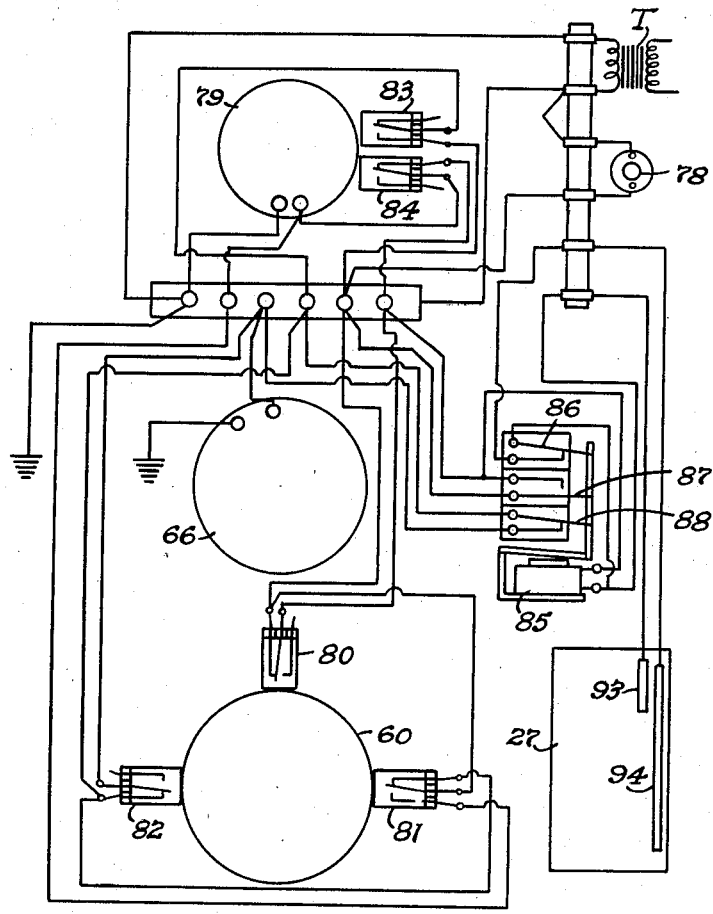

Fig. 9 corresponds to a portion of Fig. 6 showing the one electrode in a raised position indicating how the volume of Salt Draw may be predetermined;

Fig. 10 is an enlargement of a portion of Fig. 2 better illustrating the automatic control mechanism;

Fig. 11 is a front view of the control mechanism in Fig. 10;

Fig. 12 is a further enlargement of a portion of Fig. 10 better illustrating the timer motor and the drive motor;

Fig. 13 is a partial front view of Fig. 12;

Fig. 14 is an enlarged front view of the brine tank refill control valve appearing in Fig. 3;

Fig. 15 is a top view of said valve;

Fig. 16 is a vertical section through the valve on a still larger scale;

Fig. 17 is a sectional detail on the broken line 17—17 of Fig. 16, on a smaller scale;

Fig. 18 is an electrical wiring diagram of the automatic control mechanism;

Fig. 19 shows a modified or alternative construction in so far as the brine tank is concerned, and also a control mechanism operable mechanically by direct float control instead of by the electrodes and relay control of the preferred form;

Fig. 20 shows a float mechanism in a conventional wet salt storage type brine tank adapted to be used in a combination like that of Fig. 19 in place of the dry salt storage type brine tank;

Fig. 21 is similar to Fig. 20 but shows the use of electrodes, and

Figs. 22 to 25 are diagrammatic views of the multiport valve illustrating the operation thereof in service, backwash, brining, and rinsing, respectively.

The same reference numerals are applied to corresponding parts in these views.

Referring to the drawings and at first mainly to Figs. 1 to 5, the reference numeral 26 designates a water softener tank which contains a bed of zeolite or other base exchange water softening material, and 27 is a brine tank or saturator of improved design, the construction of which forms the subject matter of my copending application, Serial No. 248,210, filed September 25, 1951, which resulted in Patent No. 2,805,922, issued September 10, 1957. The multiple valve 28, which is along the lines of that disclosed in the copending applications of Charles E. Russell and myself, Serial Numbers 35,404 and 181,822, filed June 26, 1948 and August 28, 1950, respectively (which resulted in Patents No. 2,704,554 and No. 2,699,207 on March 22, 1955 and January 11, 1955, respectively), establishes different systems of fluid communication between the softener 26, brine tank 27, a source of raw water supply, a service system, and a drain in the softening operation and the several steps of regeneration, namely, backwash, brining, and rinsing. Inasmuch as the multiple valve 28 plays such an important part, a brief description of its construction and mode of operation is necessary but inasmuch as it forms the subject matter of the copending applications, it is believed that the diagrammatic illustrations, Figs. 22 to 25, will suffice.

The multiple valve 28 forms the subject matter of the parent application and comprises a body element 29 provided with a plurality of threaded holes for pipe connections, one of these holes 30 being connected, as indicated in Fig. 22, through a pipe 31 with the top of the softener tank 26 while another hole 32 in the same plane with hole 30 communicates with the bottom of the softener tank through a pipe 33. A third hole midway between the holes 30 and 32 and communicating with the port 34 has a pipe 35 connected thereto and extending from a source of raw water supply, as indicated in Fig. 22, and a fourth hole 36 communicates with the service system through a pipe 37. A hole 38 has a pipe 39 leading therefrom to the brine tank 27. Another hole 40 at the opposite end of the body 29 has a pipe 41 extending therefrom to the drain. A smooth cylindrical bore 42 is provided in the body centrally thereof and there are chambers 43, 44, and 45 provided in the body annularly of the bore and communicating with certain of the holes previously mentioned. Chamber 43 opens into a chamber 46 in the end of the body inside the cap 47. A port 48 establishes communication for chamber 43 with the bore 42. Another port 49 connects the bore 42 with chamber 44, and still another port 50 connects bore 42 with chamber 45. The hole 38 connected with the brine pipe 39 has a valve 51 for closing the same, and the hole 40 is arranged to be closed by a valve 52. Valve 52, as described in the copending application, Serial No. 35,404, is opened and closed automatically by the plunger 53 in different positions of rotation thereof. The plunger is indicated generally by the numeral 53 and is slidable and rotatable with a close working fit in the bore 42 relative to the various ports 34, 48, 49 and 50 to establish different flow circuits through the valve in the four different positions of the plunger 53 illustrated in Figs. 22 to 25. This plunger 53 carries the valve 52 on its one end, the valve 52 having an actual practice a lost-motion connection with the plunger and being spring-pressed in an outward direction relative to the plunger so that it will remain seated for a short time after some initial retracting movement of the plunger, as fully described in the copending application, Serial No. 35,404. A fairly heavy coiled compression spring S is provided between the body and plunger at the opposite end of the plunger from the valve 52 tending normally to urge the plunger inwardly toward the service position shown in Fig. 22. So much for the general details of the valve 28 itself.

The operation of the valve will be outlined briefly after I have described the means employed for transmitting endwise and rotary movement to the plunger 53. Referring to Fig. 10, the plunger 53 terminates in a stem 54 that projects from the cap end 47 of the body through a bearing 55 provided on the cap 47. A block 56 is keyed to the outer end of the stem 54, as shown at 57, and is arranged to have rotary and endwise movement communicated thereto by means of a yoke or bell-crank lever 58 that is oscillatably mounted, as indicated at 59, on the operating wheel 60. The wheel 60 is supported for rotation on bearing 55 and is in the form of a gear, but in place of ordinary gear teeth, has pegs or pins 61 projecting rearwardly therefrom in uniformly circumferentially spaced relation, between which the teeth of a pinion 62 are arranged to mesh to transmit drive to the wheel 60. The pinion 62 has a hub 63 arranged to be frictionally secured to the reduced threaded end of a shaft 64 by means of a nut 65. A drive motor 66 transmits drive through a system of reduction gears to a pinion 67 and this pinion meshes with a gear 68 fixed on the end of shaft 64 opposite the pinion 62. When the motor runs, the wheel 60 will be turned, but quite slowly, preferably so that it takes, say, about six minutes, for example, to make one complete revolution. The purpose and advantage of such slow turning of the wheel 60 will be mentioned later. By merely loosening the nut 65, the wheel 60 is freed and one may turn the wheel by hand if it is desired to check the operation of the softener, as for example, at the time of installation. The bell-crank lever 58 has a forked end 69, the fingers of which are engaged between the projecting ends of two cross-pins 70 that extend through holes in the block 56, whereby to provide a pivotal driving connection between the bell-crank 58 and the stem 54. The other end 71 of the bell-crank 58 serves as a cam follower and slides in an annular cam track 72 provided in a ring 73 that is secured by means of screws 74 to the body 29 of the valve 28. In the rotation of the wheel 60, therefore, the bell-crank 58 is moved relative to the cam track 72 and is oscillated accordingly as the end 71 is moved radially with respect to the wheel 60 as it slides in the cam track 72. An arcuate cam 75 forms a part of the cam track 72 and is pivoted at one end, as at 76, on ring 73 while a screw 77 carried on a lug projecting from the ring behind the other end of the cam forms an adjustable support for that end, whereby to permit varying the backwash flow by merely adjusting the screw 77, the cam 75 being the portion of the cam track engaged by the end 71 of the bell-crank 58 in the backwash position of the wheel 60, and the multiple valve 28 having the cylindrical plug end D of its plunger 53 of such length and diameter and so arranged relative to drain port 40 that the rate of flow of water through the valve is dependent upon the endwise adjustment of the plunger 53 relative to the bore 42. In other words, the plunger 53 in the backwash position is shifted approximately 90° from service position and also shifted endwise to the extent determined by the adjustment of the cam 75, the compound movement being obtained by 90° rotation of wheel 60, during which the bell-crank 58 not only turns the plunger 53 by means of its stem end 54 through the same angle but shifts the plunger endwise as a result of the oscillation of the bell-crank by slidable engagement of its end 71 on cam 75.

The plunger 53, as stated before, is spring-pressed inwardly relative to body 29 and is movable outwardly by means of the bell-crank 58. Hence, the end 71 of the bell-crank 58 engages cam 75 under this same spring pressure. It should be clear from inspection of Figs. 22 to 25 and from a study of the cam track 72 in Fig. 11 that the bell-crank 58 continues to hold the plunger 53 pulled out in the brining and rinsing positions and that it turns the plunger through an additional 90° in shifting from the backwash to the brining position, and then through an additional 45° or thereabouts in shifting from the brining to the rinsing position. As will soon appear there is a slow rinse during which the brine tank is refilled, the slow rinse being in fact timed by correlating it with the refilling of the brine tank at a slow enough rate to provide adequate rinsing. Then, when the brine tank is refilled, the wheel 60 turns through another 135°, or thereabouts, back to the service position, and during the first portion of that final movement, through approximately 45° turning of the plunger 53, the ports in the plug and body, which during the slow rinse were only in restricted communication are opened gradually into unrestricted communication for about a half minute for a fast rinse before the rinse flow is shut off by the further turning of the plunger 53. The fast rinse, which is faster than any normal service flow rate, is considered highly beneficial because it affords a good opportunity to clear out any traces of salt and released calcium which the slow rinse flow was incapable of removing, thereby putting the zeolite bed in the best possible condition for the resumption of softening. Analogous to the adjustment provided at 77 is another adjustment afforded by a rotatably adjustable cam C which provides a variable "rise" at the end of the cam track 72 for cooperation with the end 71 of the bell-crank 58 to insure tight seating of the drain valve 52 when the valve 28 reaches the service position. This cam is in the form of an eccentric adapted to be fastened in adjusted position by tightening the bolt $C_1$ that extends through an eccentric hole in the cam and threads in a boss on the ring 73, as clearly shown in Fig. 10. By this adjustment there is avoided the necessity for too close tolerances in the manufacture of this equipment, because the throw of the cam C is more than enough to make up for such minor irregularities as are apt to occur in the quantity production of the valves 28 and the other parts of the assembly, and the annoyance of even a slight leakage from the drain can be easily avoided by increasing the rise of the cam C relative to the end of track 72 enough to make the drain valve 52 seat a bit tighter. The rubber gasket G on the face of valve 52 compresses to allow the further movement needed for a tighter seal.

The operation of the valve 28 can now be described by referring to Figs. 22 to 25. Legends "Service," "Backwash," "Salt," and "Rinse" are provided on the front face of the operating wheel 60, as shown in Figs. 3 and 11, indicating the four operating positions of the valve 28. In the Service position, illustrated in Fig. 22, the incoming raw water from the pipe 35 is conducted through port 34 in the body 29 and through passage 43 to pipe 31 leading to the top of the softener 26. The raw water passing through the bed of zeolite in the softener is softened and soft water leaving the bottom of the tank through pipe 33 is conducted back to the valve, and thence to the service system through pipe 37. At the end of the "service" run the plunger 53 in the valve 28 is shifted to the Backwash position shown in Fig. 23 by endwise movement and simultaneous rotation through 90°, the bell-crank 58 giving this compound movement to the plunger in the turning of the wheel 60, as previously described. In the "backwash" position, the incoming raw water from pipe 35 is conducted to the bottom of the softener tank 26 through pipe 33 and flows upwardly through the bed of zeolite to break up the bed and wash out the sediment that accumulated on top of it, in order to prepare the bed for the salt draw. The waste water containing the sediment is conducted through pipe 31 from the top of the softener tank back to the valve, and thence to the drain through pipe 41. The regulation of backwash flow by adjustment of screw 77 determines the size of opening at the drain port 40 by determining how far the end D of plunger 53 is withdrawn. The backwash flow is accurately timed, as will soon appear, and at the end of the backwash the plunger 53 is turned another 90° to the Salt or Brining position illustrated in Fig. 24. In this position of the valve, the incoming raw water from pipe 35 is conducted through the plunger 53 directly to the drain 41, as indicated. The ejector E forms part of the plunger and is accordingly set into operation when the raw water is passed through the plunger to the drain. Consequently, there is entrained in the ejector E with this water going to the drain, water from the bottom of the softener tank 26 through pipe 33, and, inasmuch as the pipe 39 extending into the brine tank 27 is connected through the valve and pipe 31 with the top of the softener tank 26, brine is drawn from the brine tank into the top of the softener tank in an amount equivalent to the amount of water withdrawn from the bottom of the softener tank. In that way 100% saturated brine is supplied for most efficient regeneration of the zeolite bed. When a predetermined amount of brine has been withdrawn from the brine tank 27, the wheel 60 is turned through about 45° to the Rinse position shown in Fig. 25. In the "rinse" position, the incoming raw water from pipe 35 is conducted through pipe 31 to the top of the softener tank for passage downwardly therethrough to carry the brine through the bed and rinse out released calcium from the bed, the spent brine and waste water leaving the bottom of the softener tank being conducted through pipe 33 back to the valve and thence to the drain 41. At the same time, a much smaller amount of water is bypassed through the valve 51 through pipe 39 to the brine tank to refill it, the purpose in the restricted flow for refilling being to enable timing the rinse by the length of time it takes to refill the brine tank. During each of the steps of backwash, brining and rinsing, it will be observed that raw water is bypassed to the service system 37, so that the system is not completely shut off during regeneration.

Referring now to Fig. 18 for a general understanding of the operation, in so far as the electrical circuits are concerned, the motor 66 is arranged to be started by the operator pressing a push button 78 when the softener requires regeneration. The source of power is 110 volt, 60 cycle, alternating current, reduced to 24 volt current through the transformer T. The power units are the drive motor 66 mentioned before and the timer motor 79. The controls are the push button 78 mentioned before and limit switches 80, 81 and 82 operated by the wheel 60, limit switches 83 and 84 operated by the timer motor 79, and relay 85 controlling switches 86, 87 and 88. When the push button 78 is pressed it causes the motor 66 to run so as to turn the wheel 60 from the "service" position in a clockwise direction. The wheel starts, stops when it has turned through 90° to the "backwash" position, and remains in that position for the duration of the backwash. The switches 80–82 are spaced radially with respect to the wheel 60, as most clearly appears in Figs. 10 and 12 and there are lugs on the wheel 60 in circumferentially spaced relation and at different radii arranged to operate the three switches, one of these lugs being indicated at 89 in Fig. 10 operating the switch 80, as at the commencement of a regeneration. The operator keeps the push button 78 depressed long enough for lug 89 to close switch 80, whereupon the push button has served its purpose and may be released, the motor 66 continuing to operate until the next lug on the wheel 60, 90° removed from lug 89 operates switch 81.

Operation of switch 81 serves two functions: It opens the circuit for motor 66, causing it to stop with the wheel 60 in the "backwash" position, and it simultaneously closes the circuit for timer motor 79, causing it to run. Now, the timer motor 79 operates two cams 90 and 91 which are adjustably fixed on the shaft 92 at any selected angularity with respect to one another. The motor operates this shaft through reduction gearing so that it takes 30 minutes for the shaft to make a complete revolution. Consequently, the length of the backwash may be anything up to 30 minutes, depending upon the angular adjustment of the cams 90 and 91 relative to one another. Cam 90, which operated switch 84 to an open position at the end of the previous run to stop motor 79, closes that switch when the switch 81 starts the motor 79 running, and the motor 79 then continues to run (namely, for 30 minutes) until the cam 90 again operates switch 84 to the open position. According to the size of the included angle for which cam 91 is adjusted relative to cam 90 the backwash time is determined, because, when cam 91 closes switch 83, the circuit for the power motor 66 is closed and the wheel 60 is turned from the "backwash" position to the "salt" or "brining" position, where it stops by reason of a third lug 89' on wheel 60, 180° removed from lug 89, engaging switch 80 to stop the motor 66. In other words, switch 80 is arranged to be operated by either one of the two lugs 89 and 89', disposed 180° apart and at the same radius with respect to wheel 60. The lugs for operating switches 81 and 82 are on other radii corresponding to the radii of those switches relative to wheel 60, one of these two lugs being a lug 99 mounted for adjustment in an arc relative to wheel 60 in the arcuate slot 100 provided in the wheel, the adjustment of this lug in a clockwise direction, as viewed in Fig. 11, causing the stoppage of the wheel 60 sooner and accordingly reducing the rinse flow rate because of the fact that the ports in the plunger 53 are only in restricted communication with the ports in the body 29. If the lug 99 is adjusted in a counterclockwise direction, as viewed in Fig. 11, the wheel 60 will be stopped later and in a position in which the ports in the plunger 53 are more nearly in full register with the body ports allowing more water to flow through the softener. In either event, the flow through the valve 28 for rinse purposes is much greater than that used for refilling the brine tank, because the flow for refill purposes must, as will soon appear, be restricted almost to a trickle in relation to the rinse flow in order to prolong the rinse to the extent required for good and adequate rinsing of the bed, and such fine regulation of flow is made possible, as hereinafter described, by the bleeder valve 97 adjustable by screw 95. This valve forms the subject matter of another application, Serial No. 415,764, filed March 12, 1954, now Patent No. 2,845,089.

Continuing with Fig. 18, in the "salt" or "brining" position of the valve 28, brine is drawn from the tank 27 until the brine level drops from the electrode 93 to below the level of electrode 94. In other words, the brine maintains a circuit through relay 85 throughout the "service" operation and up to and including the "salt" or "brining" phase of regeneration. This is advantageous from the standpoint that it means such a small expense in current consumed for the sizeable advantage gained, there being enough heat generated by this small current flow to insure the relay and its switches remaining dry and free of rust and hence more certain of functioning properly. So long as the relay 85 remains energized, the valve remains in the "salt" position, but, as soon as the brine level drops below electrode 94, relay 85 is deenergized and switch 87 is closed to start the power motor 66, so that wheel 60 will be turned from the "salt" position to the "rinse" position. The lug 99 on the wheel 60 opens switch 82 to stop the motor with the wheel 60 in the "rinse" position. The restricted communication between the ports in the plunger 53 and body 29 afforded in that particular position of rotation of the plunger determines the rinse flow rate, as stated before, and to decrease the flow rate one adjusts lug 99 one way, whereas increase in the flow rate is obtained by adjusting the lug 99 in the opposite direction. The rinse period is timed, as previously described, by timing the refilling of the brine tank 27. This timing involves the adjustment of a screw 95 to restrict flow through a bleeder groove $V_1$ on one side of a seat 96 provided in an elbow fitting 97 for a ball check valve V. This fitting 97 is provided on the upper end of the brine pipe 39 and connects it with the valve 28 by means of a pipe 98. The ball check valve V unseats to allow unrestricted out-flow of brine from the tank 27 through pipe 39 during the brine draw, but, when the valve 28 is in the "rinse" position, the ball check valve V tends to close under pressure of raw water flowing in the opposite direction through pipe 39 into the brine tank, the refill flow rate being determined by the close adjustment of screw 95 relative to groove $V_1$ so that it will take long enough to refill the brine tank to insure a good and adequate rinsing of the bed in the softener tank 26. Usually, the screw 95 is used only to restrict flow through groove $V_1$. However, it can be used also to unseat the ball V more or less, but that would, of course, permit more flow than is permitted through the groove $V_1$ when the screw is backed up all the way. There is no danger of the ball check valve V reaching any position during the brine draw where it would constitute an obstruction to brine flow, because there are lugs 96' projecting from opposite sides of the bore in the outlet leg of the fitting 97 which keep the ball check valve V caged in the fitting in spaced relation to the end of the pipe 98. It is important to note that with this arrangement, changes in water pressure will not affect the rinsing operation appreciably because if the water pressure drops from, say, 50 pounds to say 25 pounds, so that there is half as much water flowing through the bed, that same pressure drop results in proportionately reducing the amount of water going into the brine tank 27 to refill it. Consequently, the softener is assured of a proper rinsing under all conditions. The advantage of the ball check valve V and screw for adjusting the flow through the bleeder groove $V_1$, as compared with having, let us say, a restricted by-pass port regulated by a needle valve, is that I obtain the desired fine restriction without involving the danger of the restriction being clogged by dirt and sediment, because the ball check valve V closes one side of the groove $V_1$, to define the restricted bleeder port, and this valve V is unseated every time the valve 28 is moved to the "salt" or "brining" position, and hence any foreign matter that might have collected between the ball check valve V and the groove $V_1$ will be cleared out by the flow of the brine. When the water level in the brine tank 27 rises to the point where it contacts electrode 93, the circuit through relay 85 is closed again, opening switch 87 and closing switches 86 and 88 so as to start the power motor 66 and turn the wheel 60 from the "rinse" position back to the "service" position where lug 89 opens switch 80 and stops the motor 66, the wheel 60 and valve 28 connected therewith then remaining in the "service" position until the next regeneration of the softener is commenced by the operator pressing the button 78 again.

It is important to note that the operations of "backwash," "salting" and "rinsing" are independent of one another and merely follow one another. Consequently, any adjustment of or any abnormality in any one of these operations has no effect on the succeeding operation. Thus, the softener stays in the "service" position until the circuit is closed by the push button 78, whereupon the valve is shifted to the "backwash" position; then it stays in the "backwash" position until the timer motor 79 closes the circuit for the motor 66 to shift the valve to the "salt" position; it stays in the "salt" position until a predetermined amount of brine has been drawn, whereupon the valve is shifted to the "rinse" position, where it stays until the brine that has been drawn from the brine tank is replaced by raw water, after which the valve shifts back to "service" position. In contrast to this, other automatic softeners have a backwash, followed by a rinse, which is controlled by a time clock that predetermines having the complete cycle occur in a given length of time. Hence, if drawing the salt requires more time than the designer originally figured it would, due to the water pressure available, the extra time required for the long salt draw would necessitate subtracting from the rinse time remaining and allowable in the overall time program. In other words, in these other automatic softeners any abnormal condition in one step of the regeneration makes necessary some sort of a comprise in a preceding or a following step. With the present invention, there are no such difficulties because only the backwash time is measured by the timing motor 79 and sufficient leeway can be allowed to insure an adequate length of backwash, regardless of anticipated changes in water pressure. In any installation there must, of course, be sufficient water pressure available to cause the ejector E (Fig. 24) to operate even at the lowest pressure, where the operation would be slower, but even under such adverse conditions the valve will remain in the salt or brining position until a predetermined amount of brine has been transferred to the softener. In the rinse operation, assuming there has been proper adjustment of the screw 95 for the brine tank refilling rate and proper adjustment of the lug 99 for the rinse flow rate, it follows that any anticipated fluctuation will affect these two operations alike, and, if the pressure drops, the rinse rate drops proportionately but the refill rate also drops proportionately, so that the time required for the two operations to be completed is proportionately extended, thereby insuring that the total amount of water passed through the softener in the rinse operation is about the same in each regeneration regardless of pressure fluctuation.

While I have described a softener in which regeneration is started by pressing a push button 78 it should be understood that this same function can be performed by a meter closing the electrical circuit when a predetermined gallonage of water has passed through the softener, or the circuit can be closed by a time clock mechanism at the end of a selected time interval, or the circuit can be closed by any hardness testing device when the water going to the service system falls below a predetermined standard as to hardness. In the foregoing description I also described the backwash as timed by the motor 79 according to the setting of the dogs 90 and 91, but it should be understood that the backwash flow could be controlled as to time by a turbidity or color detector in the form of a photoelectric cell which would maintain the valve in the backwash position until the water going to the drain became clear.

The housing 101, in which the power motor 66 and timer motor 79 are mounted and in which the drive gear train connected with the motor 66 is also housed, and also the switches 80, 81 and 82, is, as shown in Fig. 11, removable from the rest of the assembly, it being secured to the ring 73 by means of bolts 102 for support with the pinion 62 meshing in the pin gear 61 provided on the back of the wheel 60. This simplifies the problems of servicing the softener, because, in the event of any electrical trouble, the service man merely removes the housing 101 and replaces it with another sealed unit and sends or takes the removed unit back to the factory without having tampered with any of the mechanism therein, and then it can be repaired by those at the factory especially qualified to do such work. If the service man did not happen to have a replacement unit ready to install, the softener could be regenereated by hand operation of valve 28 by turning the wheel 60 from "service" to "backwash" and from "backwash" to "salt" and from "salt" to "rinse" and finally from "rinse" back to "service." In like manner, the valve 28 may be operated manually while the power unit is still in place, by merely loosening the nut 65 to permit the pinion 62 to turn freely relative to shaft 64, thereby leaving the wheel 60 free to be turned manually.

A U-shaped sheet metal housing 105 is secured to the top of the fixed rear section 106 of the cover of the brine tank 27, as shown at 107, and has a generally U-shaped lid or cover 108 closing the open front thereof, the top 109 of which is of generally cylindrical form and overlies the top of the housing 105 and is hinged thereto at the rear, as indicated at 110, so as to permit swinging the cover upwardly and rearwardly to an out-of-the-way position, as indicated in dotted lines in Fig. 2, a handle or knob 111 being provided on the front lower portion of the cover 108 to facilitate the opening and closing. Pipes 33 and 37 extending horizontally from opposite sides of the body of the valve 28 extend through holes in the side walls of the housing 105 and serve to support the valve on the housing, the rear portion of the valve extending through a hole in the rear wall of the housing 105, as shown in Fig. 2, to further support the valve on the housing and prevent turning thereof about the pipes 33 and 37 as an axis. The brine pipe 39, which extends downwardly from the valve through an opening in the cover 106, as shown in Fig. 3, is also an important factor in holding the valve steady. Of course, as soon as the various pipes extending from the valve are connected up with the raw water pipe, service pipe and drain pipe in an installation, such connections serve to make the valve that much more rigid.

The brine tank 27, while capable of being used in connection with a hand operated softener, is most advantageous when used in combination with the present automatic softener, because it is designed to permit adding salt in whatever amount may be needed and whenever the operator, upon removing the removable front cover section 112, sees that the salt level is not near enough to the top of the tank 27, in the vicinity of the dot and dash line *ab* in Fig. 4. The present brine tank or saturator is of the improved overhead or dry salt storage type forming the subject matter of my copending application, Serial No. 284,210, filed September 25, 1951, which resulted in Patent No. 2,805,922, issued September 10, 1957. The conventional brine tank may be described as the wet salt storage type because in that design the salt is dumped into the bottom of the tank onto a gravel bed in which a slotted suction pipe for removal of brine is embedded, and the tank is filled with water nearly to the top. With that type there is no telling for certain whether enough salt is present to produce a saturated brine solution, and if there is not enough and the tank is filled with water, one cannot then add the required amount of salt without beforehand removing an equivalent volume of water, or brine of whatever concentration is present. As a result, softeners are often put through the cycle of regeneration with brine of insufficient concentration and in that way softeners of otherwise good design and construction will, of course, fail to function properly and may be subjected to unfair criticism. Then tool, the wet salt storage type has the objection that the water collects dust and dirt much more readily than dry salt, and there is moreover a tendency for crystallization of salt on the walls of the tank upwardly from the brine level and down on the outside of the tank, and this accumulation grows and gradually makes the tank more and more unsightly and unsanitary. Furthermore, with that type, due to the fact that the brine is removed from the bottom, the nonsoluble materials, which in commercial softener salt run anywhere from ½ to 1% up to as high as 2%, settle to the bottom of the brine and are eventually drawn into the softener, and these nonsoluble materials being heavier than the zeolite in the softener tank had a tendency to accumulate in the bottom of the bed and act as a binder and form an obstruction to the backwash flow. It follows therefore, that in order to replenish the salt supply in the conventional brine tank, where it is being used in conjunction with an automatic softener, the operator must arrange to be there when the softener goes through its regeneration cycle and pour in the salt as soon as the brine has been withdrawn, or else he must take out enough brine to make room for the salt that he adds. In either event, the procedure is not satisfactory, because a normal brine draw for a single regeneration does not provide enough space to enable the operator to add as much salt at one time as he would like to. On the other hand, if the operator seeks to avoid removing any brine in order to add salt and still avoid causing the brine tank to overflow, he would find that he could not add enough to make up for what was used even in a single regeneration, and, as a result, the brine present in the tank would necessarily be far below the saturation required for good regeneration of the zeolite. In the brine tank 27, as best appears in Figs. 3 and 4, a bed of dry salt is supported in elevated relation to the bottom 113 of the tank in the dry salt storage compartment 114, only the lower portion of the salt bed being in contact with the water, which maintained at the level indicated by the dot and dash line cd in Fig. 4, slightly above the top 115 of an open bottom drum 116 that is supported in slightly elevated relation to the bottom 113 of the tank on legs 117 and provides therein the brine compartment 118. An opening 119 is provided in the top 115, and a cover plate 120 is disposed over this opening and has feet 121 supporting it in slightly elevated relation to the top 115 so as to allow water to flow upwardly through the opening 119 and out between the top 115 and cover 120, as indicated by the arrow in Fig. 4. The salt poured in on top of the drum 116 fills the annular space 122 around the drum 116, the top 115 being of an octagonal form and abutting the walls of the tank only at the points of the octagon leaving spaces 123 between these points through which the salt can flow down into the annular space 122. The water in contact with the salt between the bottom 113 of the tank and the line cd forms brine, and it being heavier than the water, settles to the bottom and enters the brine compartment 118 from all sides of the bottom thereof, as indicated by the arrows in Fig. 4, displacing the water or brine of lesser concentration upwardly and out through the opening 119, so that a natural circulation is set up, which continues until all of the water has become fully saturated and is 100% brine. The cover 120 has a central opening 124 through which the brine pipe 39 extends, as shown, the pipe terminating above the bottom 113 of the tank so as to leave a sump in which nonsoluble materials may be collected and separated out from the salt, and removed from time to time, instead of having it drawn into the softener tank where it would settle to the bottom of the bed and act as a binder and thus form an obstruction to backwash flow. A well tube 125 fixed to the cover 106 extends downwardly through the salt bed and through an opening 126 in the top 115 of the drum 116 and provides an enclosure for the electrodes 93 and 94, which, as previously described, are used as feelers in the automatic operation of the softener to stop the salt draw when the level of the brine has dropped to below the lower end of the electrode 94, and to stop the rinse flow when the water level in the refilling of the brine tank has reached the line cd. down to which level the electrode 93 extends. The electrode 93 is not adjusted up or down relative to the cover 106, because the lower end of this electrode is disposed at the level of the line cd and, of course, the water level must always be at least a certain distance above the top 115 of the brine drum 116. However, the amount of brine drawn per regeneration may be varied to suit the different sizes of softeners and for that reason the electrode 94 is slidable upwardly relative to the cover 106, as indicated in Fig. 9, to permit measuring the distance B, which represents the amount of brine that will be withdrawn to the salting or brining operation. This dimension B will, of course, be increased for larger softeners and decreased for smaller softeners in accordance with a table which the manufacturer of the softener will furnish as a part of the directions for installation. The electrodes 93 and 94 are insulated from one another and from the well tube 125 by collars 127 of any suitable insulating material, these insulators being clamped in place by the tightening of bolts 128 which also serve to hold together the two channels forming the two halves of the well tube.

In lieu of the electrodes 93 and 94, I may, as shown in Fig. 19, provide a float well 129 alongside the brine tank 27' connected by means of a pipe 130 with the bottom of the brine compartment 118' that is provided in the drum 116', so that the float 131 in the well tube 129 will move up and down with the water level in the brine tank and shut off the rinse flow when the level c'd' is reached. The rod 132, extending upwardly from the float, has projections 133 and 134 thereon, the projection 133 being adjustable lengthwise of the rod up or down according to the dimension B previously mentioned. A double throw limit switch 135, which takes the place of the relay 85 and limit switches 86—88, is thrown one way by the projection 133 at the end of the salt draw to start the motor 66 to shift the valve 28 to the rinse position, and is thrown the other way by projection 134 at the end of the rinse flow when the brine tank 27' has been refilled, whereby to start the motor 66 again to shift the valve 28 from the rinse position to the service position.

A similar result is obtainable with a conventional brine tank 27a with a float 131' moving up and down in the top brine compartment, as shown in Fig. 20, the lever indicated at 135' being associated with a switch like the switch 135 to cause the motor 66 to be thrown into operation when the brine level drops and the projection 133' causes a downward movement of lever 135', whereby to shift the valve 28 from the salt position to the rinse position. Then, when the brine tank has been refilled during the rinse operation and the float 131' has been raised to the position shown in full lines in Fig. 20, the other projection 134' on the rod 132' throws the lever 135' upwardly and operates the switch 135 to cause the motor 66 to run and operate the valve 28 from the rinse position to the service position.

A further alternative is shown in Fig. 21 where a conventional brine tank 27a is shown having electrodes 93' and 94' provided therein in the brine compartment, these electrodes being connected with the automatic control mechanism the same as electrodes 93 and 94 of Figs. 3 and 4 to cause a shifting of the valve 28 from salt position to rinse position when the brine drops to below the level of the electrode, and later to cause the shifting of the valve 28 from the rinse position to the service position when the brine tank has been refilled to the level of the electrode 93'.

A further alternative is to provide in conjunction with a pipe extending down into the brine compartment either a bellows or a flexible diaphragm subject to increase and decrease in air pressure in the pipe above the level of the brine as the level rises and falls, and utilize the diaphragm or bellows to actuate a switch to cause a shifting of the valve 28 from the salt position to the rinse position when the brine drops to a predetermined level, and later to cause the shifting of the valve 28 from the rinse position to the service position when the brine tank has been refilled to a certain level.

It is believed the foregoing description conveys a good understanding of the objects and advantages of my invention. The appended claims have been drawn to cover all legitimate modifications and adaptations.

I claim:

1. In combination, a brine tank, an electric motor operated valve mechanism, an open bottom brine concentrator drum of appreciable height disposed in the bottom of the brine tank into which pipe means for brine outflow and water inflow extends from said valve mechanism, said drum being in open communication at the top and bottom thereof with the inside of the brine tank and supporting on the top thereof a bed of salt of substantial depth, and water level control means for keeping the reserve salt supply in the brine tank dry, said means comprising a high level electrode and a low level electrode in said brine tank at high and low levels, respectively, relative to said drum and electrically connected with the electric motor of said valve mechanism, so as to operate said motor to shift said valve mechanism from the salt draw position to rinse position.

2. In combination, a brine tank, an electric motor operated valve mechanism, an open bottom brine concentrator drum of appreciable height disposed in the bottom of the brine tank into which pipe means for brine outflow and water inflow extends from said valve mechanism, said drum being in open communication at the top and bottom thereof with the inside of the brine tank and supporting on the top thereof a bed of salt of substantial depth, and water level control means for keeping the reserve salt supply in the brine tank dry, said means comprising a high level electrode and a low level electrode in said brine tank at high and low levels, respectively, relative to said drum and electrically connected with the electric motor of said valve mechanism, so as to operate said motor to shift said valve mechanism from the salt draw position to rinse position said brine outflow and water inflow pipe including a check valve that opens to allow unrestricted outflow of brine and closes to allow only a restricted inflow of water, so that the length of the rinse flow is determinable by the time required for slow refilling of the brine tank with a like amount of raw water after a given amount of brine has been withdrawn.

3. The combination set forth in claim 2, wherein said check valve includes a manual adjustment for varying the refill flow rate and accordingly increasing or decreasing the rinse time.

4. An automatic control mechanism for a water conditioner and associated brine tank comprising, in combination with a valve mechanism connected by said pipes with said water conditioner and brine tank, and with a service system and a source of raw water supply under pressure, and a drain, and arranged to be shifted rotatively through a series of predetermined positions, of an electric drive motor operatively connected with the valve mechanism, an electric timer motor serving to time the staying of the valve mechanism in backwash position, the same including a manual adjustment whereby any portion of a total time involved in a cycle of the motor may be selected, a program wheel which turns with the valve mechanism, limit switches electrically connected with said electric drive motor and arranged to be mechanically operated by projections on said wheel to open the motor circuit and thereby predetermine stopping points in the turning of the valve mechanism, an open bottom brine concentrator drum disposed in said brine tank and supporting on the top thereof a bed of salt of substantial depth, and auxiliary level controlled make and break means in said brine tank at high and low levels with respect to the top of said drum and connected in circuit with the drive motor and limit switches and dependent, first of all, upon the valve mechanism reaching a salt draw position where a drop in fluid level in said brine tank proximately due to that position of the valve starts the drive motor to move the valve mechanism to rinse position, and, then, with the valve mechanism in rinse position the rise in fluid level in said brine tank also proximately due to that position of the valve starts the drive motor to move the valve mechanism back to its starting position, the fluid level rise being so limited with respect to the level of the top of the drum to keep the reserve salt supply in the brine tank dry.

5. A control mechanism as set forth in claim 4, wherein one of the projections on the program wheel is manually adjustable arcuately in either direction to advance or retard one of the stops of the valve mechanism and accordingly increase or decrease the rinse flow rate according to the position of the valve mechanism.

6. In an automatic water softener control mechanism, a valve mechanism connected with a softener and a brine tank and adapted to be connected with a source of raw water under pressure, a service system, and a drain, a motor for shifting the valve mechanism from a service position through a series of positions including backwash, salt draw, and rinse, and back to service, a timer motor for timing the backwash, including a manual adjustment for selecting any fraction of a cycle time through which the timer motor runs whenever started, an open bottom brine concentrator drum disposed in said brine tank and supporting on the top thereof a bed of salt of substantial depth, level responsive means in the brine tank of high and low levels with respect to said drums for timing the salt draw in accordance with drop in brine level in said brine tank and for timing the rinse in accordance with rise in water level in said brine tank during rinse, said level responsive means permitting water level rise in relation of the top of said drum only to a level to keep the reserve salt supply in the brine tank dry, said valve mechanism bypassing water to the brine tank for refilling during rinse, and a manually adjustable valve for metering this refill flow so as to take long enough for an ample rinse.

7. An automatic water softener control mechanism as set forth in claim 6, including a manual adjustment for regulating the flow rate in backwashing.

8. An automatic water softener control mechanism as set forth in claim 6, including a manual adjustment for regulating the flow rate in rinse.

9. In combination, a brine tank, an electric motor operated valve mechanism, an open bottom brine concentrator drum of appreciable height disposed in the bottom of the brine tank into which pipe means for brine outflow and water inflow extends from said valve mechanism, said drum being in open communication at the top and bottom thereof with the inside of the brine tank and supporting on the top thereof a bed of salt of substantial depth, and a pair of elongated electrodes suspended in the brine tank in spaced insulated relationship to one another by nuts adjustably threaded on the upper ends thereof, one of said electrodes being a high level electrode and the other a low level electrode at high and low levels, respectively, relative to said drum, said electrodes being electrically connected with the electrical motor operated means.

10. In combination, a brine tank, an electric motor operated valve mechanism, an open bottom brine concentrator drum of appreciable height disposed in the bottom of the brine tank in which pipe means for brine outflow and water inflow extends from said valve mechanism, said drum being in open communication at the top and bottom thereof with the inside of the brine tank and supporting on the top thereof a belt of salt of substantial depth, and a pair of elongated electrodes suspended in the brine tank in spaced insulated relationship to one another by nuts adjustably threaded on the upper ends thereof, one of said electrodes being a high level electrode and the other a low level electrode at high and low levels, respectively, relative to said drum, said electrodes being electrically connected with the electrical motor operated means. said brine outflow and water inflow pipe including a check valve that opens to allow unrestricted outflow of brine and closes to allow only a restricted inflow of water.

11. The combination set forth in claim 10, wherein said check valve includes a manual adjustment for varying the refill flow rate and accordingly increasing or decreasing the rinse time.

References Cited in the file of this patent

UNITED STATES PATENTS

| | | |
|---|---|---|
| 1,346,898 | Kingsbury | July 20, 1920 |
| 1,630,512 | Ault | May 31, 1927 |
| 1,768,184 | Wolff | June 24, 1930 |
| 1,893,933 | Dotterweich | Jan. 10, 1933 |
| 2,051,155 | Staegemann | Aug. 18, 1936 |
| 2,067,808 | Zimmerman et al. | Jan. 12, 1937 |
| 2,209,487 | Wagner | July 30, 1940 |
| 2,363,167 | Daniels | Nov. 21, 1944 |
| 2,407,538 | Daniels | Sept. 10, 1946 |
| 2,539,748 | Mueller | Jan. 30, 1951 |
| 2,636,560 | Rogers | Apr. 28, 1953 |

FOREIGN PATENTS

| | | |
|---|---|---|
| 470,842 | Great Britain | Aug. 18, 1937 |
| 528,672 | Great Britain | Nov. 4, 1940 |